/

US005613419A

United States Patent [19]
Pierson et al.

[11] Patent Number: 5,613,419
[45] Date of Patent: Mar. 25, 1997

[54] LOAD BALANCING ARM

[75] Inventors: Cary M. Pierson, Milwaukie; Stephen L. Heston, Portland, both of Oreg.

[73] Assignee: Integrated Systems, Inc., Milwaukie, Oreg.

[21] Appl. No.: 541,671

[22] Filed: Oct. 10, 1995

Related U.S. Application Data

[63] Continuation of Ser. No. 233,020, Apr. 25, 1994, Pat. No. 5,456,130, which is a continuation of Ser. No. 839,632, Feb. 24, 1992, abandoned.

[51] Int. Cl.$^6$ ..................................................... F15B 13/16
[52] U.S. Cl. ................... 91/361; 91/390; 91/428; 177/212; 248/162.1; 248/325; 248/648
[58] Field of Search ............................ 91/361, 390, 428, 91/433; 177/212; 248/162.1, 280.1, 292.1, 325.1, 648

[56] References Cited

U.S. PATENT DOCUMENTS

| | | | |
|---|---|---|---|
| 3,259,351 | 7/1966 | Olsen | 248/325 |
| 3,554,091 | 1/1971 | Spyridakis | 91/428 |
| 3,721,416 | 3/1973 | Goudreau | 248/325 |
| 3,880,393 | 4/1975 | Watson | 248/325 |
| 4,279,192 | 7/1981 | Kleinwaks | 91/361 |
| 4,807,518 | 2/1989 | Berchtold et al. | 91/361 |

FOREIGN PATENT DOCUMENTS 215681   6/1968   U.S.S.R. .................................. 91/390

*Primary Examiner*—F. Daniel Lopez
*Attorney, Agent, or Firm*—Keith A. Cushing

[57] ABSTRACT

A load balancing arm is shown and described as having improved control including a programmable control element and electronic air regulation to provide precise and controllable lifting force on a load. The disclosed load balancing arm responds to slight operator applied force to aid in movement of the load in overcoming system hysteresis, friction and load inertia without requiring the operator to apply a sufficiently large magnitude force to overcome such counteracting forces in the system. The disclosed load balancing arm further includes automatic load weight detection sensors for accommodating variation in load weights while applying a lifting force to the load which substantially equals the weight of the load. This allows the operator to move the load freely throughout a work space.

4 Claims, 7 Drawing Sheets

LOAD BALANCING ARM

RELATED APPLICATIONS

The present application is a continuation of U.S patent application Ser. No. 08/233,020 filed Apr. 25, 1994 by applicant's herein and issued Oct. 10, 1995 as U.S. Pat. No. 5,456,130 which was a file wrapper continuation of U.S. patent application Ser. No. 07/839,632 filed Feb. 24, 1992 by applicants herein, now abandoned.

BACKGROUND OF THE INVENTION

The present invention relates generally to mechanical lifting apparatus, and particularly to load balancing arms for carrying the weight of a load and allowing an operator to then move the load by operator applied forces within a work space.

A load balancing arm assists an operator in manipulating a load within a given work space. The load balancing arm attaches to and carries the weight of the load by maintaining a constant lifting force on the load throughout the work space. The operator manipulates heavy loads, much greater than the operator's lifting ability, as if the loads weighed little or nothing. In other words, the operator is not required to move the load in the fashion of a button controlled hoist whereby, for example, the operator presses an "up" button to move the load up and a "down" button to lower the load. In contrast, load balancing arms enable the operator the grab and move the load directly in a natural fashion as if the weight of the load was within the operator's lifting capacity and without manually operating control buttons to control direction of movement.

A load balancing arm is also useful for workers doing moderately strenuous repetitive tasks such as transferring items between a bin and a conveyor. Even if the weight of one item is well within the worker's lifting capability, because the worker repeats the task all day, the job can be strenuous. Because the load balancing arm carries the weight of the load, the job is less strenuous and, therefore, more productive. As may be appreciated, however, in performing such repetitive tasks, it is desirable that the load balancing arm allow natural movement of the load and not resist operator applied forces.

Unfortunately, movement of a load within the work space requires operator applied forces to the load balancing arm or the load itself in order to accelerate the load into motion. The operator must overcome certain counteracting forces present in the system, i.e., forces reactive to operator applied forces, before the load will move. These reactive forces are generally a function of the weight of the load and can affect significantly the use of a load balancing arm for repetitive tasks with moderately heavy loads, e.g., on the order of pounds and less frequent tasks with very heavy loads, e.g., on the order of pounds.

The inertia of the load resists movement as does all mass accelerated into motion by application of force. The greater the weight of the load, the greater the mass and, therefore, the greater the resistance to operator applied force.

Frictional forces within the structure of the load balancing arm also resist movement of the load by operator applied force. These reactive forces can vary depending on mechanical design, but some friction will always be present in the structure of a load balancing arm. Most load balancing arms use a linkage assembly as an arm structure and friction exists between these links. Before the load can move, the operator must apply sufficient force to overcome friction within the links. The greater the lifting capacity for the load balancing arm the greater the mechanical friction and, therefore, the greater the resistance to operator applied force.

The active components of the system responsible for maintaining a constant lifting force on the load also resist operator applied forces. Pneumatic cylinders are used to maintain a constant force against one side of a lever arm within the load balancing arm in order to maintain a constant lifting force on the load. When the operator moves the load, however, this changes the volume of the air chamber within the cylinder and, therefore, changes the pressure in chamber. As a result the lifting force deviates from the desired lifting force. Air pressure regulators have been used to maintain a given pressure set point within the pneumatic cylinder, but these regulators have introduced counteractive hysteresis into the system. Before the air regulator can detect a change in pressure and adjust the lifting force applied to the load, the operator must actually move the load to affect air pressure with the pneumatic cylinder. Furthermore, the air pressure regulator cannot react immediately, having neutral band above and below the pressure set point where it makes no pressure correction, and the operator must move the load through sufficient range of motion to develop the necessary pressure differential to actuate the air regulator. For heavy load capacity systems, the greater the load and, typically, the greater the counteractive hysteresis.

It is, therefore, desirable to reduce such forces counteractive to operator applied forces.

In U.S. Pat. No. 3,880,393 issued Apr. 29, 1975 to Robert W. Watson and entitled Load Balancer With Balance Override Control, a load balancing arm is shown and described as including an override control for active movement of a load. The override control takes the system out of a balanced condition, bypassing the normal control circuitry and imposing a control pressure different from that utilized in maintaining the load in a balanced condition. An operator must separately actuate the mechanism to urge the load in a desired direction of movement. The Watson Load Balancer, therefore, does not provide the type of "natural" manipulation of the load as is desired in a load balancing arm. In other words, the Watson machine simply has a "hoist mode" where the override control drives the load into motion by adjusting the lifting force applied to the load. Thus, the Watson device does not provide for "hands on" movement of the load as if the operator were really picking up the load, rather the operator must operate a separate control button in the fashion of a hoist control system.

U.S. Pat. No. 3,721,416 issued Mar. 20, 1973 to N. G. Goudreau and entitled Loading Balancer shows a load balanced arm which responds to an operator applied force to then urge the load in a corresponding direction. The loading balancer shown by Goudreau, however, does not solve the problem of eliminating or reducing forces counteractive to operator applied force. In the Goudreau device, the operator must still exert a given magnitude of applied force in order to first move the load before the system can implement a change in the lifting force. In the Goudreau device, a "feeler" cylinder responds to movement of the load to detect an indicated direction of movement and then biases the lifting force in order to accomplish that direction of movement. Important to note, the operator must overcome the inertia of the load, the friction within the system, and any hysteresis present in the system before the system can accomplish the task of actively moving the load in the desired direction.

In use of a load balancing arm, the operator moves a load engaging mechanism, located at the distal end of the load balancing arm, next to the load. The operator actuates the load engaging mechanism and it attaches to the load in some fashion, e.g., such as by clamping or vacuum. The load balancing arm, once coupled to the load, introduces the lifting force to accept at least some of the weight of the load. A lifting force greater than the weight of the load is undesirable because the arm would travel with the load unless held back by the operator. In such case the operator expends energy, i.e., operator applied force, even with the load stationary within the work space. A lifting force less than the weight of the load also allows the load to travel and always requires some effort by the operator in carrying the remaining weight of the load, whether the load is held stationary or moved through the work space. As may be appreciated, the closer the load balancing arm lifting force is to the weight of the load, the less operator applied force is necessary to move the load freely through the work space. The lifting force may vary somewhat from an ideal balance condition, i.e., a lifting force matching exactly the weight of the load, to the extent that friction and system hysteresis holds the load against travel. The goal has been to provide a lifting force substantially equal to the weight of the load, or at least close enough to prevent travel of the load, and allow the worker to move the load within the work space by simply overcoming the inertia of the load, friction within the arm and any hysteresis of the components providing the constant load balancing lifting force.

If the load engaging mechanism loses the load while the load balancing arm is applying a lifting force, the load balancing arm can suddenly "fly-away" as it attempts to maintain a constant lifting force. Thus, an important safety aspect of load balancing arms relates to detection and appropriate response to a lost load condition. Current lock-up safety systems use hydraulic type systems to prevent "fly-away." The hydraulic systems introduce additional resistance to easy movement of the load by increasing friction, i.e., friction within the hydraulic system added, and hysteresis, the force needed to move the hydraulic fluid within the safety lock-up system.

Load balancing arms typically include a pantographic arm. A pantographic arm generally comprises a vertically rotatable housing carrying a pantographic arm linkage with a load engaging mechanism at the distal end of the arm. The pantographic arm is characterized by a pivotally mounted lifting arm attached to the vertically rotatable housing and allowed rotation about a fulcrum. A counter weight on one side of the fulcrum counter balances the weight of the lifting arm. A downward extending work arm pivotally attached on the other side of the fulcrum to the distal end of the lifting arm extends into the work space and carries at its distal end a load engaging mechanism, typically specific to the type of load to be manipulated. Third and fourth links of the pantographic arm pivotally couple to one another and to the lifting arm and work arm, respectively, to complete a parallelogram linkage.

The above-noted U.S. Pat. Nos. 3,880,393 and 3,721,416 each show such pantographic load balancing arms. Other examples of load balancing arms generally characterized as pantographic arms may be found in the following U.S. Patent Documents: U.S. Pat. No. 4,666,364 issued May 19, 1987 to Doege, et al and entitled Low Friction Cylinder For Manipulators, based on the pantograph principal and equipped with a pneumatic balancer control; U.S. Pat. No. 4,659,278 issued Apr. 21, 1987 to Doege, et al and entitled Manipulator, based on the pantograph principal; U.S. Pat. No. 4,421,450 issued Dec. 20, 1983 to Kouno and entitled Cargo Handling Apparatus; U.S. Pat. No. 4,215,972 issued Aug. 5, 1980 to Yamasaki, et al and entitled Transfer Mechanism Employing Swingable Arm Formed As A Parallelogram Linkage; U.S. Pat. No. 3,883,105 issued May 13, 1975 to Matsumoto and entitled Load Handling Equipment; U.S. Pat. No. 3,747,886 issued Jul. 24, 1973 to Carlson, et al and entitled Load Balancer With Safety Control; U.S. Pat. No. 3,615,067 issued Oct. 26, 1971 to N. G. Goudreau and entitled Load Balancer; U.S. Pat. No. 3,259,351 issued Jul. 5, 1966 to R. A. Olsen and entitled Load Balancer Assembly; and U.S. Pat. No. 3,259,352 issued Jul. 5, 1966 to R. A. Olsen and entitled Loading Balancer Assembly. A review of the above-noted U.S. Patents provides a history of pantographic arm development and is believed representative of the type of arm linkages used in such pantographic arm arrangements for load balancing arms.

The load engaging mechanism can comprise suction cups held against a package and an operator actuated button for drawing air from under the suction cups to produce a vacuum between the load engaging mechanism and the package. Other examples include clamping jaws responsive to an operator actuated button to close and grasp the load. While many load engaging mechanisms would include an operator actuated button for actuating the load engaging mechanism, such a load engaging mechanism could be automatically actuated when brought next to the load. Many load engaging mechanisms have been provided at the distal end of load balancing arms.

The pantographic parallelogram linkage provided by the arm maintains the load within a horizontal plane when operator applied forces are horizontal. In other words, due to the pantographic geometry of the arm the operator may apply strictly horizontal forces and move the load along a horizontal plane within the work space.

Load balancing arms include some mechanism for applying the lifting force to counter balance at least part of the weight of a load attached to the distal end of the arm. Such lifting force has been applied to the pivotally mounted lifting arm of the pantographic parallelogram linkage to provide an upward force on the load, i.e., rotate the lifting arm about its fulcrum in suitable direction to lift the load.

Other examples of load balancing arms take a variety of forms, but may be generally characterized as devices which carry the weight of a load and allow an operator to then move the load freely throughout a work space. In such load balancing systems, the operator applies forces directly to the load or the load balancing arm in order to move the load. In such load balancing systems, operator applied forces must overcome the inertia of a load, friction within the system, and hysteresis within the active components of the load balancing arm which maintain a constant lifting force on the load throughout the work space.

Load balancing arms according to current practice are efficient at handling consistent weight loads repeatedly. The lifting force required to balance the unloaded and loaded conditions can be preset at the regulator and the regulator may be switched between two such lifting forces in use of the load balancing arm as it switches between its unloaded and loaded conditions. When balancing multiple weights is required, however, cumbersome and slow automatic or semi-automatic systems are currently used, but do not provide the type of flexibility in available lifting forces which would be desirable, especially in the context of loads having varying or unpredictable weights. When the operator needs to move the load, the operator must accelerate the load in some fashion and overcome the inertia, friction and hysteresis of the system. Thus, load balancing systems according to current practice tend to exert counteracting forces responsive to operator applied forces, and therefore tend to make the task of moving a load more difficult.

SUMMARY OF THE INVENTION

In accordance with a preferred embodiment of the present invention, a manipulator arm includes a pantographic linkage assembly and a mechanism for applying a lifting force to a load attached at a distal end of the manipulator arm. The device includes a programmable control element for selectively applying the lifting force to the load. In the preferred embodiment the control mechanism includes an electronic air regulator system for controlling a pneumatic cylinder for vertically positioning a horizontal guide track capturing one pivot point of the linkage assembly according to a selected lifting force.

The subject matter of the present invention is particularly pointed out and distinctly claimed in the concluding portion of this specification. However, both the organization and method of operation of the invention, together with further advantages and objectives thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF A PREFERRED EMBODIMENT

Figure 2:
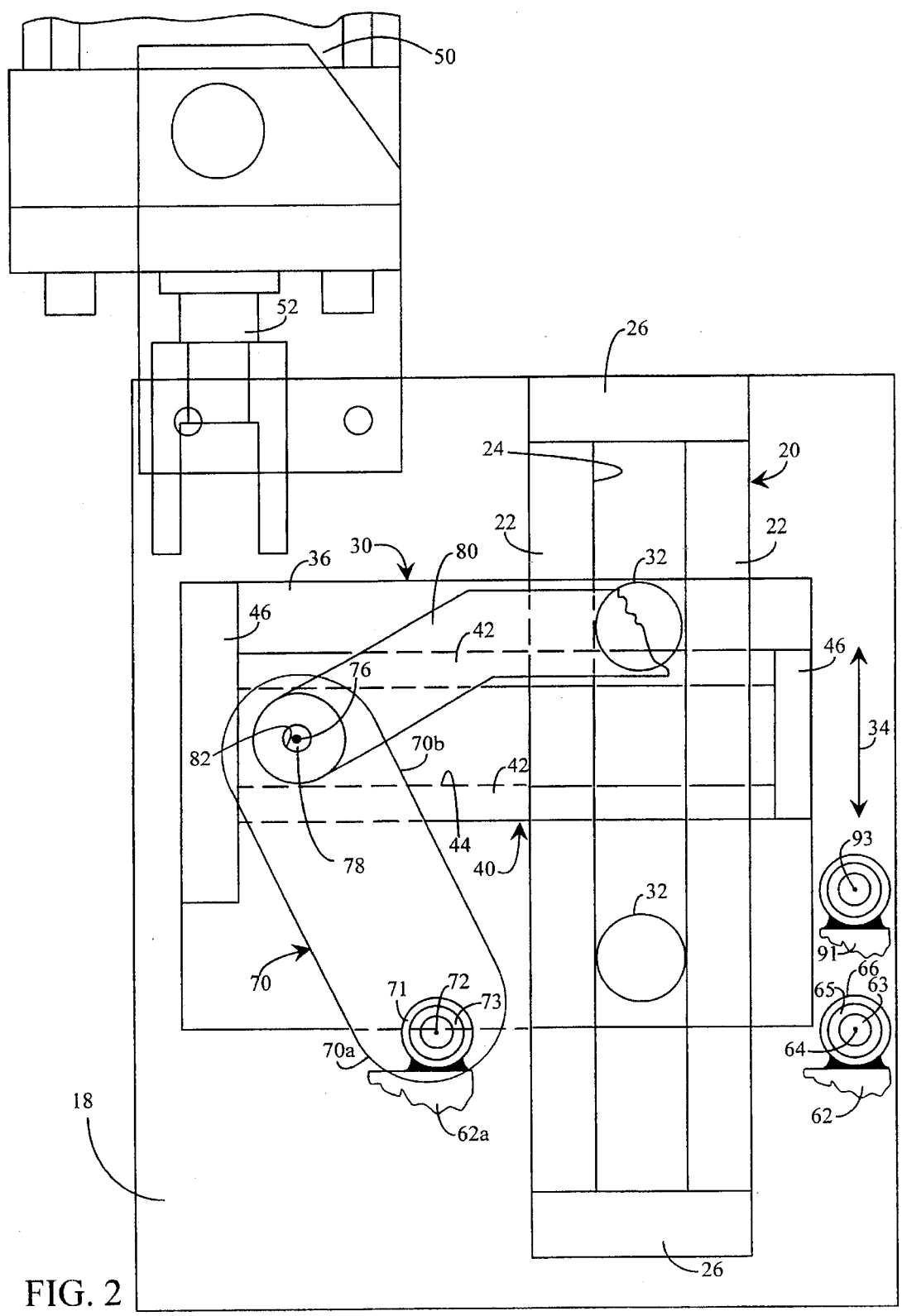
FIG. 2 illustrates a vertical guide and horizontal guide of a vertically rotatable pivot housing of the load balancing arm of FIG. 1.
Figure 3:
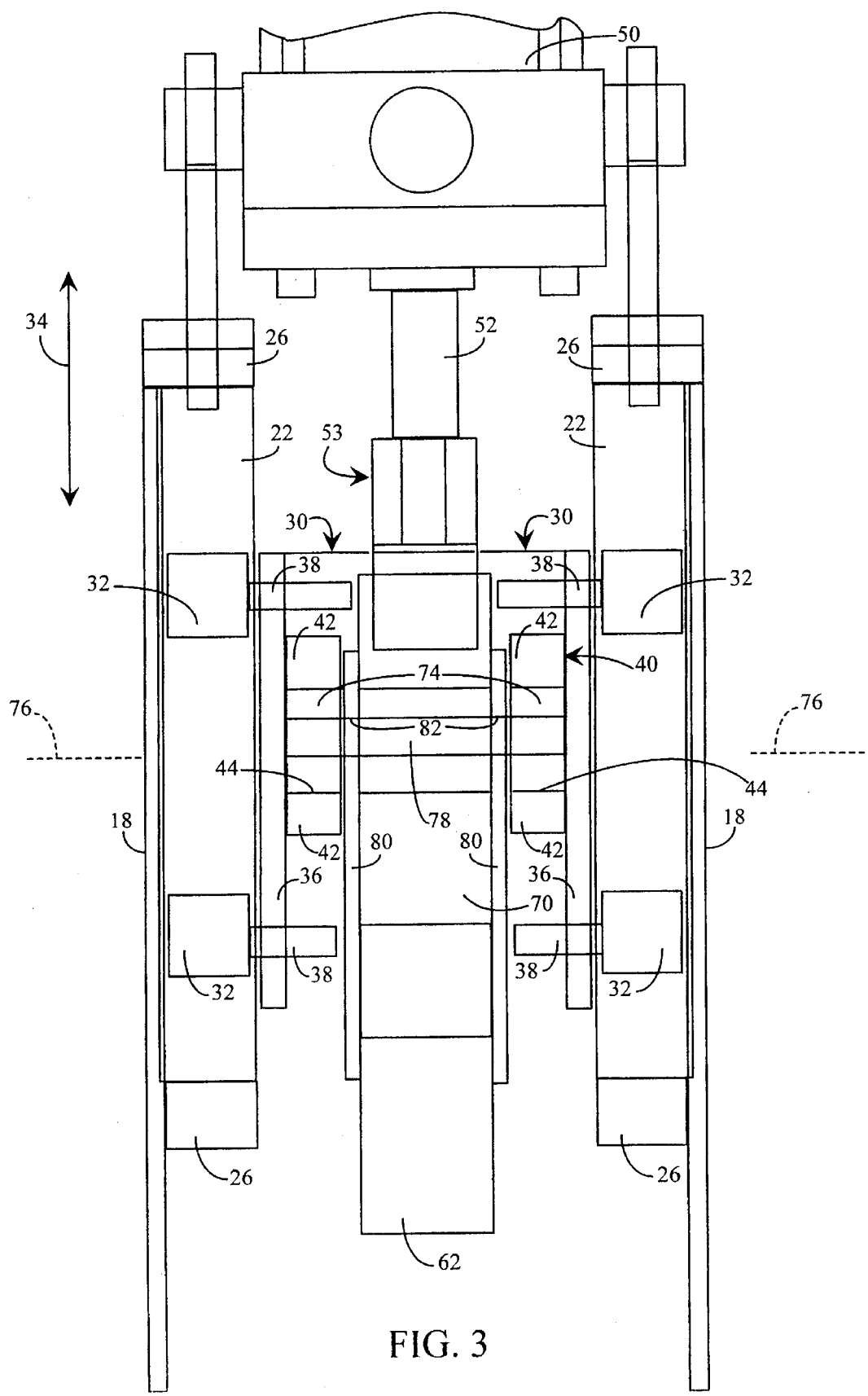
FIG. 3 further illustrates structural components of the vertically rotatable pivot housing of the arm of FIG. 1.

The preferred embodiment of the invention, as illustrated in the drawings, is a load balancing arm 10. Arm 10 includes a floor mounted vertical column 12 defining a vertical axis of rotation 14 about which a pivot housing 16 freely rotates upon a bearing plate (not shown). With reference to FIGS. 2 and 3 in conjunction with FIG. 1, pivot housing 16 includes a pair of outer side plates 18 in fixed parallel face-to-face relation. The outer side plates 18 are fixed vertically, but freely rotate about the vertical axis 14. Each plate 18 carries on its inner surface a vertical guide 20. Each guide 20 includes a pair of parallel vertical rails 22 defining a guide channel 24 terminated at each end by stop blocks 26 of vertical guide 20.

The pivot housing 16 further includes an inner frame 30 (FIG. 3) slidably mounted to the outer plates 18 by way of four guide rollers 32 captured within the vertical guides 20. The inner frame 30 carries a pair of inner side plates 36, each parallel to a corresponding one of the outer side plates 18 and carrying a pair of vertically aligned guide rollers 32. One pair of vertically aligned guide rollers 32 on one side of the inner frame 30 is captured within one of the vertical guides 20 while the other pair of vertically aligned guide rollers 32 is captured in the other vertical guide 20. More particularly, the inner side plates 36 carry four posts 38 extending outward and into the vertical guide channels 24 for rotatable mounting of the corresponding guide rollers 32. Thus, the inner frame 30 is vertically movable relative to the outer side plates 18 as indicated generally by the double headed arrows 34 in FIGS. 1–3.

The inner side plates 36 also each carry an inward-facing horizontal guide 40. Each horizontal guide 40 includes a pair of parallel rails 42 defining a horizontal guide channel 44 terminating at stop blocks 46 of each horizontal guide 40.

A pneumatic cylinder 50 attaches to the upper portion of outer plates 18 and provides a downward extending rod 52. The distal end of rod 52 attaches to the inner frame 30 at the coupling 53 (FIG. 3) for controllably positioning the inner frame 30 along the vertical guides 20. As shown in FIG. 2, the rod 52 is detached from the inner frame 30 for clarity, but is shown attached in the illustration of FIG. 3.

The pneumatic cylinder 50 is a single action cylinder providing a given downward force on the inner frame 30 when supplied with a given air pressure. By maintaining constant the air pressure supplied to pneumatic cylinder 50, a constant force is applied to the inner frame 30. As explained more fully hereafter, such applied force to frame 30 is used to selectively counter balance the arm 10 and a load 122 carried on the manipulator arm 10, and also to selectively bias the load in a given direction to overcome the inertia of the load and system hysteresis in response to slight operator applied forces.

The load balancing arm 10 includes a pantographic linkage 60 supported by the pivot housing 16. The pantographic linkage 60 thereby rotates freely about the vertical axis 14. The linkage 60 is a parallelogram linkage forming a pantographic structure. In the linkage 60, a lifting arm link 62 pivotally mounts to the pivot housing 16 at a fulcrum axis 64. In so mounting the lifting arm link to the pivot housing 16, a pin 63 spans the space between the outer plates 18 and provides a mounting for a bearing 65 which is surrounded by a collar 66 (FIG. 2) fixedly attached to the lifting arm link 62. Thus, lifting arm link 62 pivots relative to housing 16 about the horizontal fulcrum axis 64. The rear portion 62a (FIGS. 2 and 3) of link 62, i.e., on the rear side of axis 64, carries a counter weight 68 of sufficient mass to counterbalance the weight of the outward extending front portion 62b (FIG. 1), i.e., on the opposite side of axis 64.

A rear link 70 pivotally attaches at a lower end 70a to the portion 62a of lifting arm link 62 at a pivot axis 72. More particularly, a collar 71 fixedly attached to the rear portion 62a of link 62 surrounds a bearing 73 which in turn rotatably supports the link 70. The upper end 70b of rear link 70 carries two outward extending rollers 74 (FIG. 3) each captured within corresponding ones of the horizontal guides 40. A pin 78 fixedly attaches to the link 70 and provides stud mounting of the rollers 74.

A top link 80 pivotally couples to the rear link 70 at the axis 76 by engagement of the pin 78 through apertures 82 of the top link 80.

A front link 90 (FIG. 1) pivotally couples the lifting arm link 62 and the top link 80 at the pivot axes 92 and 94, respectively. In the illustrated embodiment, the front link 90 includes a pair of plate members 96 secured in parallel face-to-face spaced relation and providing pivotal mounting of the links 62 and 80 thereto. More particularly, the links 62 and 80 extend into the space between the plates 96 and are there pivotally attached to the plates 96. The front link 90 also includes a downward extending portion 90a affixed to plates 96 and defining at its distal end a load point 98.

The points 92, 94 and 98 are co-linear and define a line 97 maintained parallel to the rear link 70 by virtue of the pivotal connections and relative dimensioning of the links 62, 70, 80 and 90. Also, the links 62 and 80 remain in parallel relation.

The pantographic linkage 60 provides an important feature of the load balancing arm 10. The ideal load balancing arm simply carries the weight of a load and allows the operator to push that load vertically and horizontally to a desired position within a work space without the effects of gravity. In such use of a load balancing arm, it is important that for horizontally applied forces the load moves in strictly horizontal directions. It is undesirable for the downward extending portion 90a to swing in pendulum-like fashion in response to horizontally applied forces because such pendulum-like swinging causes a change in vertical position for the load. The pantographic configuration of the assembly 60 accomplishes the goal of horizontal movement in response to horizontal forces by virtue of the capturing of the axis 76 within a horizontal plane defined by the horizontal guides 40. By so restricting the axis 76 to horizontal movement, when horizontal forces are applied to the distal end of portion 90a, the load point 98 necessarily moves in a horizontal plane. Such use and operation of pantographic arm assemblies is well known and well documented in the U.S. Patent Document referenced herein above.

A three dimensional work space 100 is defined by the range of movement for the load point 98. Relative movement of among the links 62, 70, 80 and 90 of the assembly 60 allows movement of load point 98 within a rectangular area 102. The rectangular area 102 is a portion of a vertical plane containing, or parallel to planes containing, the links of the pantographic linkage assembly 60. Rotation of the pivot housing 16 about the vertical axis 14 defines the three dimensional work space 100 as the region of space through which the area 102 moves about the axis 14 in response to rotation of housing 16 about the axis 14. The three dimensional work space 100, therefore, defines a region through which the load point 98 may be moved by rotation of the pivot housing 16 about the axis 14 and by relative movement among the various links 62, 70, 80 and 90 of the assembly 60.

Figure 1:
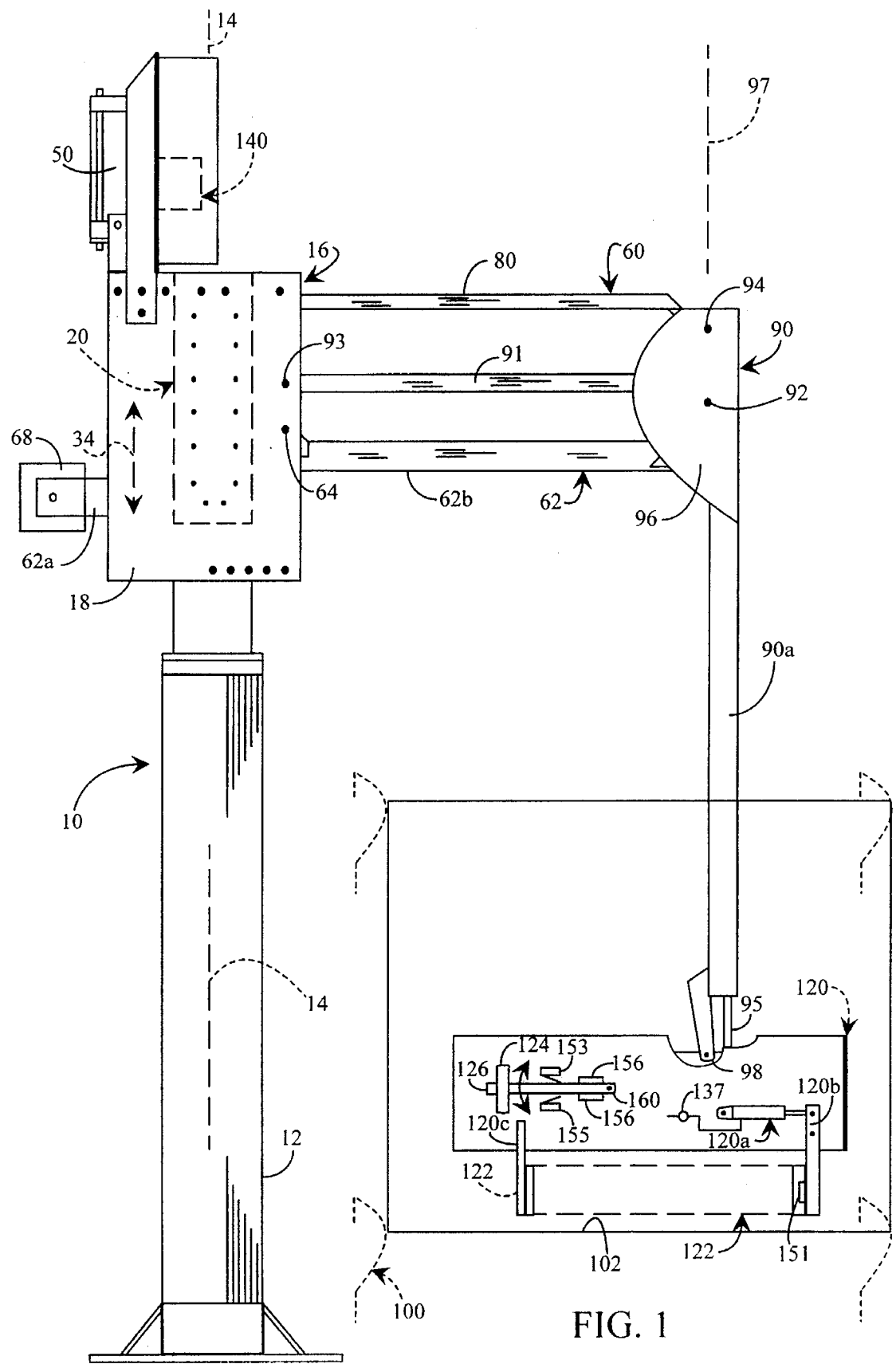
FIG. 1 is a side view of a load balancing arm according to a preferred embodiment of the present invention.

A load engaging mechanism 120 (shown schematically in FIG. 1) couples the load point 98 to a load 122 (also shown schematically in FIG. 1). The load engaging mechanism 120 may be implemented by a variety of devices such as by clamping jaws, suction cups or other such load engaging mechanism commonly found in the context of load balancing arms. As illustrated herein, the load engaging mechanism 120 is characterized by a handle 124 which carries an operator actuated button 126 for initiating engagement of a load 122 by the mechanism 120. Thus, actuation of button 126 would correspond to the actuation of clamping jaws or the drawing of air from under suction cups, depending on the type of load engaging mechanism used. It should be understood, however, that the mechanism 120 need not be operator actuated, and switch 126 may be automatically actuated to engage a load as sensing contact with or proximity to the load, e.g., a vacuum pump automatically energized when the suction cups are held against the load or clamping jaws engaged when positioned about the load.

The pantographic arm assembly 60 further includes a parallel link 91 pivotally attached at its proximal end to the side plates 18 at the pivot point 93. The distal end of parallel link 91 attaches pivotally to an orientation bracket (not shown) which is in turn pivotally attached to the plates 96 of link 90 at the pivot point 92. The downward extending portion 90a of link 90 includes a slidably mounted orientation rod 95 also pivotally attached to the orientation bracket between plates 96 of link 90. Thus, as the links of assembly 60 move relative to one another, the orientation rod 95 slides within the downward protruding portion 90a of link 90 and maintains a constant orientation relative to the load point 98. In this manner, the load engaging mechanism 120 may be pivotally attached at both load point 98 and at the distal end of orientation rod 95 in order to maintain a constant orientation for the load engaging mechanism 120.

In use of load balancing arm 10, the pneumatic cylinder 50 receives a constant air pressure corresponding to a desired force to be applied to the inner frame 30 for urging the lifting arm link 60 into counter clockwise movement, in the view of FIG. 1, and deliver the necessary lifting force to counter-balance the system. The magnitude of lifting force delivered by the pneumatic cylinder 50 is a function of the condition of arm 10. More particularly, in an unloaded condition the applied lifting force counter balances the weight of the arm, including the load engaging mechanism 120, in such manner to balance the arm 10 in its unloaded condition. When the load engaging mechanism 120 couples to a load 122, the magnitude of lifting force applied is increased to a given value to compensate for the additional weight on load point 98 and establish a balanced condition for the arm 10. In any case, it is necessary to maintain a constant lifting force on the inner frame 30 throughout movement of the load point 98 within the work space 100. As may be appreciated, however, in moving the load point 98 about the work space 100 the pressure in pneumatic cylinder 50 varies by virtue of the corresponding vertical movement of inner frame 30. The volume of the air chamber within pneumatic cylinder 50 is a function of the position of inner frame 30 and inner frame 30 moves as a function load 122 movement.

Thus, an important control feature of a load balancing arm making use of a pneumatic cylinder for applying a lifting force is to maintain constant the air pressure in the pneumatic cylinder. Such control can be provided by an air regulator which maintains a constant air pressure within the chamber of the pneumatic cylinder. Under such a control scheme, however, the operator must actually move the load a sufficient distance to cause a change in the pressure within the pneumatic cylinder of sufficient magnitude to affect the operation of the air regulator to either bleed air from the chamber of the pneumatic cylinder or introduce new air into the chamber of pneumatic cylinder and thereby maintain a desired air pressure set point within the pneumatic cylinder. This aspect of traditional load balancing arms making use of pneumatic cylinders for a counter balancing lifting force introduces counteractive hysteresis, i.e., resists movement of the load by operator applied forces.

Figure 4:
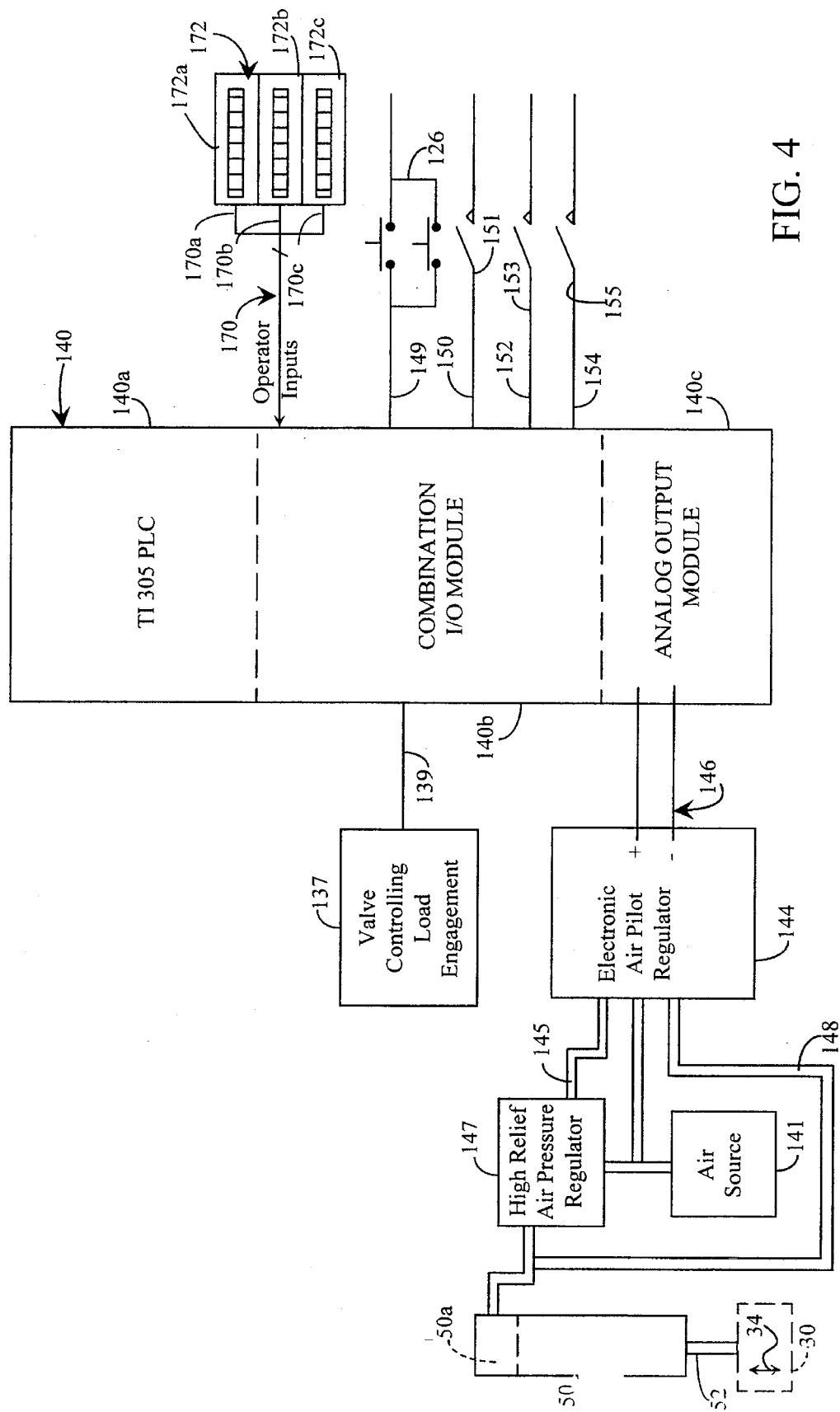
FIG. 4 is a block diagram schematically illustrating the control arrangement for the manipulator arm of FIG. 1.

FIG. 4 illustrates a control system for the load balancing manipulator arm 10 of FIGS. 1–3. In FIG. 4, a programmable logic controller (PLC) 140 includes a main processing portion 140a, an I/O module 140b, and an analog output module 140c. As may be appreciated, while a programmable logic controller is shown as an illustration of one embodiment of the present invention, many programmable control devices may be employed to accomplish system control according to the present invention.

The analog output module 140c drives an electronic air pilot regulator 144 by way of an output signal presenting a pressure command 146 for delivery to the pneumatic cylinder 50. Air pilot regulator 144 responds to the pressure command 146 from PLC 140 by producing at its output conduit 145 a small volume but precise air pressure as a reference or set point pressure. The conduit 145 couples to a high relief air pressure regulator 147 which in turn drives the upper chamber 50a of pneumatic cylinder 50 and thereby moves the inner frame 30. The electronic air pilot regulator 144 of the illustrated embodiment of the present invention is available from ProportionAair™ under Model No. BB2MFDE100. The high relief air pressure regulator 147 is available from Norgren™ under Model No. 11-042-002. Both regulators 144 and 147 receive pressurized air from an air source 141. High relief air pressure regulator 147 performs a volume amplification function accepting the reference pressure at conduit 145 and delivering a corresponding higher volume and constant air pressure to chamber 50a. Regulator 147 monitors the air pressure so delivered to chamber 50a, compares it to the reference pressure within conduit 145, and either bleeds air out of chamber 50a or forces air into chamber 50a to maintain the pressure set point as indicated by the reference pressure in conduit 145, i.e., as indicated by regulator 144 and ultimately by PLC 140.

Thus, it may be appreciated that by delivering a given pressure command 146 to the air pilot regulator 144 a pressure set point is established and maintained by operation of the regulators 144 and 147 to maintain a given pressure within the chamber 50a. As may be appreciated, while the pressure command 146 may be an analog signal presented to the regulator 144, the PLC 140 can generate this analog signal directly as a function of a desired lifting force at the load point 98 given the various leverage ratios and specific mechanical features of the load balancing arm 10. Thus, as expressed herein, the command 146 may alternatively be stated in terms of a given lifting force, but it will be understood that suitable conversion to an analog signal as the command 146 is executed by PLC 140 in implementing that selected lifting force. PLC thereby has a broad range of selectable lifting force available and may quickly switch to any given lifting force within that range by modification of the pressure command 146 applied to regulator 144.

To further enhance the ability of air regulators 144 and 147 to maintain constant a given air pressure within chamber 50a, air pilot regulator 144 includes a secondary pressure input by way of conduit 148 representing the current air pressure within chamber 50a. In this manner, the air pilot regulator 144 receives directly a measure of the air pressure within chamber 50a and can more quickly adjust to slight changes in the air pressure in chamber 50a in order to then compensate for such changes by modification of the pressure delivered to air regulator 147 by way of conduit 145. In this configuration, the counteracting hysteresis normally associated with air pressure regulators such as air pressure regulator 147 is substantially avoided. The electronic air pilot regulator 144 better performs the task of monitoring air pressure within chamber 50a and adjusting to changes in air pressure existing in chamber 50a as a result of movement of a load 122 within the work space 100.

Thus, it may be appreciated how a selected pressure set point may be established and well maintained within the chamber 50a of cylinder 50, even when the load moves throughout the work space 100.

The PLC 140 receives system inputs at the I/O module 140b. Input 149 represents the state of button 126 on load engaging mechanism 120. Accordingly, in response to actuation of button 126 the PLC 140 actuates the load engaging mechanism 120 to attach to the load 122. For the purpose of illustration, the load engaging mechanism 120 is shown as an end-clamping jaw mechanism including a pneumatic cylinder 120a, a pivoting jaw 120b actuated by cylinder 120a, and a stationary jaw 120c. Actuation of button 126 causes actuation of pneumatic cylinder 120a to pivot clockwise, in the view of FIG. 1, the jaw 120b and capture the elongate load 122 between the jaws 120b and 120c. While a specific load engaging mechanism 120 is shown herein, it will be understood that a variety of such load engaging mechanisms may be employed without departing from the subject matter of the present invention. PLC 140 provides an output 139 for controlling a valve 137 coupled to the pneumatic cylinder 120a of load engaging mechanism 120. The output 139 is a bi-state output dictating engaged and disengaged states for the load engaging mechanism 120, i.e., corresponding to extension and retraction of the pneumatic cylinder 120a.

The input 150 represents a "load attached" condition corresponding to successful coupling of the manipulator arm 10 to the load 122. The input 150 is provided by a switch 151 responsive to a given condition of the load engaging mechanism 120. For the end clamping jaws 120b and 120c, the switch 151 could respond to a closed condition or to engagement of a load between the jaws. In the illustrated example of load engaging mechanism 120, the switch 151 lies at the load engaging portion of jaw 120b and reacts to a given magnitude of pressure against jaw 120b as indicative of the successful engagement of the load 122. Thus, switch 151 may be a limit switch protected by resilient material deformed sufficient distance to actuate switch 151 when a load has been successfully engaged by the mechanism 120. Alternatives to this scheme would include a load cell as the switch 151 which would actually measure and report the magnitude of pressure exerted against the jaw 120b. Other methods of detecting a successful load engagement would include a proximity detector as the switch 151 indicating the presence of a load in a given position relative to the load engaging mechanism 120. In a suction cup based load engaging mechanism 120, the switch 151 could be responsive to a given pressure, i.e., vacuum condition, at the underside of the suction cups. In any case, the switch 151 corresponds to successful attachment of a load by the load engaging mechanism 120 and a variety of devices can perform this function depending on the nature of the load engaging mechanism 120.

The inputs 152 and 154 correspond to an operator applied force indicating generally a direction of desired movement of the load 122. The inputs 152 and 154 as provided by a switches 153 and 155, respectively, may take a variety of forms. In the illustrated embodiment, the switches 153 and 155 are limit switches adjacent a handle 124 of load engaging mechanism 120. The handle 124 is permitted slight pivotal movement about the point 160, but otherwise provides a stable structure for grabbing and manipulating the mechanism 120. When an operator grabs handle 124 and lifts upward, the handle 124 pivots slightly about the point 155 and causes a state change in the limit switch 153 as represented in the input 152 to PLC 140.

Similarly, the input 154 corresponds to the condition of a limit switch 155 performing a similar function as that of switch 153, but indicating a downward operator applied force. It is suggested that the handle 124 as pivotally mounted at the point 160 include a resilient structure 156, affixed to the body of mechanism and stationary relative to the point 160, for maintaining the handle 124 in a "neutral" position engaging neither switch 153 nor switch 155. Thus, the resilient structure 156 may take a variety of forms, and may vary in resiliency to correspond to different weights of load 122. More particularly, for heavy loads 122 it may be desirable to provide a less resilient structure 156 to require that the operator apply slightly greater force to engage switches 153 and 155 as compared to that for lighter loads 122.

Thus, upon slight upward or downward force applied to the handle 124, only enough to deform slightly the structure 156, the handle 124 engages one of switches 153 and 155 and indicates to PLC 140 by way of inputs 152 and 154, respectively, a desired direction of vertical travel for the load 122. Important to note, this slight operator applied force need only be sufficient to change the state of switch 153 or 155, and is far less than an operator applied force necessary to actually move the load 122, i.e., overcome counteracting forces of the load balance arm 10. Also, it may be appreciated that movement of the load 122 in this fashion, i.e., as assisted by a biasing or modification in the lifting force applied to load point 98, is a "natural" way for the operator to move the load 122. In other words, the operator applied forces are applied directly to the handle 124 and in the desired direction of movement. This is considered more natural, and therefore an improvement over, a system requiring the operator to manipulate a separate set of control buttons such as in a hoist based system.

In response to the input 152, i.e., a state change in switch 153, the PLC 140 provides additional biasing air pressure to cylinder 50, beyond that which counter balances the load 122, to actually lift the load so long as switch 153 is engaged by handle 124. PLC 140 performs a similar function in response to the input 152, but reducing the lifting force applied to the load 122 to cause lowering of the load 122 in response to slight downward pressure on the handle 124. In either case, PLC 140 takes the load balancing arm 10 out of balance relative to the weight of load 122 and thereby urges load 122 into motion in the indicated direction. When the operator releases handle 124, or reduces the slight pressure applied to handle 124, PLC 140 responses by going back to the balanced condition applying a lifting force matching the weight of load 122.

The amount of biasing or change in lifting force in response to operator applied force to handle 124 may be a function of the load 122 weight. It is suggested that the change in lifting force relative to balanced condition, where the lifting force equals the load 122 weight, be calculated as a selected percentage of load 122 weight. Thus, given the weight of load 122 and a selected percentage value, e.g., on the order of seventeen percent, PLC 140 can respond to inputs 150 and 152 by calculating a modified lifting force applied to load 122 for as long as one of switches 151 or 153 are activated.

Returning to FIG. 4, PLC 140 receives operator selected inputs 170 from an operator input module 172. The input module may take a variety of forms and provide a variety of inputs relative to system operation. In the illustrated embodiment, input module 172 provides three thumbwheel switches 172a–172c each providing a corresponding input 170a–170c. The inputs 170a–170c are thereby selected from a set of preset values.

The input 170a identifies one of several preset lifting force values corresponding to the weight of several different types of load 122. The arm 10 may, for example, be used for several different types of load 122, each with different, but known, weight. Thus, input 170a corresponds to a selected type of, i.e., weight of, load 122. The operator turns thumbwheel switch 172a to select a type of load 122 and PLC 140 would reference this value when providing the command 146 to regulator 144 to specify a desired pressure set point for cylinder 50.

Inputs 170b and 170c correspond to preset selectable percentage values for up and down biasing, respectively, of the load 122. Thus, the operator may select different biasing forces for up and down movement of the load 122. In establishing suitable up and down biasing values, i.e., the extent to which a lifting force is modified to aid in up and down movement of a load, system counteractive frictional forces and hysteresis may be considered. For example, an ideal balance condition exists when the lifting force exactly equals the weight of the load and the load, therefore, remains stationary within the work space 100. Due to system hysteresis and frictional forces, however, the actual lifting force may vary somewhat from the exact weight of the load and the load will remain stationary within the work space 100. This is also true for the unloaded condition of arm 10, i.e., the counterbalancing forces applied to the lifting arm link 62 may vary somewhat from that required to counterbalance exactly the weight of the assembly 60 and the load engaging mechanism 120. The arm 10 remains stationary so long as the variation in lifting force applied, relative to the ideal lifting force, does not overcome system hysteresis and frictional forces.

Thus, a stationary condition for arm 10, and load 122 if attached, may exist within a range of bias relative to the counterbalancing lifting force. Biasing may also go outside that range to actively move the load 122. For example, down biasing may be achieved by reducing the lifting force to such extent that the arm is on the threshold of falling whereby the operator need only apply slight additional downward force, beyond that required to activate one of switches 153 and 155. Alternatively, up biasing force may be at the threshold of actual upward movement of a load 122, or the unloaded arm 10, and slight additional upward operator applied force moves the arm 10. Alternatively, up and down biasing can be great enough to actively move the system in its unloaded or loaded condition. Thus, a great variety of operator selectable up and down biasing parameters are available under the present invention.

Figure 5:
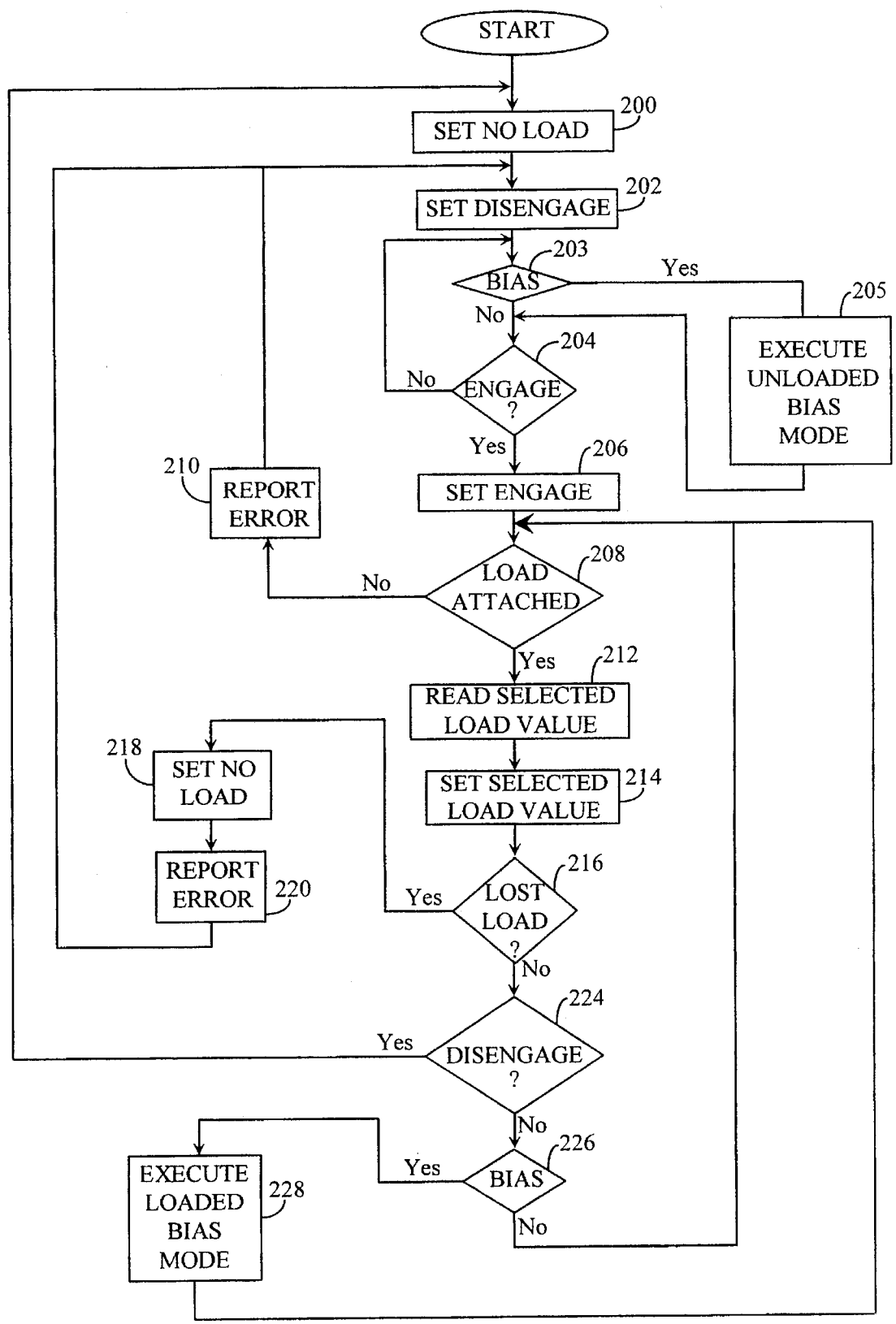
FIG. 5 shows a control scheme by way of flow chart for the illustrated load balancing arm of FIG. 1.

FIG. 5 illustrates a basic control scheme by way of flow chart for the load balancing arm 10. In FIG. 5, PLC 140 first sets the pressure command 146 to a no load condition in block 200, i.e., establishes an air pressure set point for pneumatic cylinder 50 corresponding to a balanced condition of an unloaded arm 10. In block 202, PLC 140 sets by way of output command 139 a disengaged condition for the load engaging mechanism 120. At this point, the operator may freely move the load balancing arm 10 about the work space 100 to move the load engaging mechanism 120 to a pickup area for a load 122.

In this unloaded condition, PLC 140 in decision block 203 monitors the limit switches 153 and 155 to detect operator applied force on the handle 124 indicating a desire for upward or downward movement of load engaging mechanism 120. In decision block 204, PLC 140 monitors button 126 to detect a desire to engage a load 122. If in decision block 203 PLC 140 detects actuation of one of switches 153 and 155, processing branches to block 205 where PLC executes an unloaded bias mode for load balancing arm 10.

In the unloaded biased mode, PLC 140 modifies the lifting force applied to arm 10 to aid the operator in up and down movement of the load engaging mechanism 120. Thus, in response to actuation of switch 153, PLC 140 increases the lifting force applied to load point 98, relative to the unloaded condition for arm 10, by the corresponding percentage value indicated in the input 170b. For actuation of switch 155, PLC decreases the lifting force applied to load point 98, relative to the unloaded condition for arm 10, to aid in lowering of the load engaging mechanism 120 in response to slight downward operator applied force on the handle 124.

As discussed hereinabove, the biasing of the lifting force applied to the unloaded arm 10 may vary according to operator preference. The biasing force may bring the arm 10 to the threshold of movement in the desired direction, i.e., match the counteracting forces in the arm 10. In such cases, the operator need only apply slight additional force, beyond that needed to activate one of switches 153 and 155, to then urge the load into motion. Alternatively, the extent of biasing relative to the unloaded condition of arm 10 may be great enough to overcome such counteracting forces in the arm 10 to actively move the load 10 without any additional force exerted by the operator other than that slight force required to actuate one of switches 153 and 155. Unloaded bias mode then continues for so long as the detected one of switches 153 and 155 remains actuated. Once unloaded bias mode terminates, processing then continues to decision block 204 where PLC references the input 149 to determine whether the operator has indicated a desire to engage the load 122. Control loops between the decision blocks 203 and 204 until the operator has actuated button 126 and input 149 indicates a desire to actuate the load engaging mechanism 120.

Continuing to block 206, PLC 140 outputs a suitable command 139 to actuate the load engaging mechanism 120 and couple the arm 10 to the load 122. In decision block 208, PLC 140 monitors the input 150 to determine whether or not the load engaging mechanism 120 has successfully coupled to the load 122. If the load engaging mechanism has not successfully coupled to the load 122, processing branches through an error block 210 and returns to block 202. If input 150 indicates successful attachment to the load 122, then processing continues to block 212.

In the block 212, PLC 140 reads the input 170a as representative of a selected lifting force to be applied at the load point 98. Using this input value 170a, PLC 140 in block 214 outputs a suitable command 146 to set the selected load value as a lifting force and maintain that lifting force at the load point 98.

At this point, the arm 10 is in a loaded balanced condition whereby the operator may freely move the load throughout the work space 100. PLC 140 then monitors the condition of arm 10 to determine the next operational step. In decision block 216, PLC 140 monitors the input 150 to determine whether the load remains attached to the load engaging mechanism 120. If the load engaging mechanism has lost the load 122, processing branches to block 218 where PLC 140 immediately sets arm 10 to its no load condition to prevent fly-away. In block 220, PLC 140 reports the error condition to the operator and returns to block 202 where the load engaging mechanism 120 is disengaged by way of output 139 and processing continues as described above.

If the operator actuates button 126 to indicate a desired disengagement of the load 122, in block 224 PLC 140 detects this actuation of button 126 and branches to block 220. As result, PLC 140 returns to its no load condition and disengages load 122 from the load engaging mechanism 120. It is important that the two steps executed in blocks 200 and 202 occur substantially concurrently to prevent the occurrence of a no load condition in arm 10 without also substantially concurrently disengaging the load 122. In decision block 226, PLC 140 responds to the actuation of one of switches 153 and 155 indicating a desired direction of vertical movement for load 122. If no such actuation of buttons 153 and 155 are indicated in block 226, then processing returns to block 216 and PLC 140 continues to loop through decision blocks 216, 224 and 226 while the operator manipulates the load within the work space 100.

If, however, PLC 140 detects actuation of one of buttons 153 and 155 in block 226, process branches to block 228 where PLC 140 executes a biased lifting mode for arm 10. In the biased lifting mode, PLC 140 first determines which of switches 153 and 155 have been actuated, and then reads the corresponding percentage value, i.e., one of inputs 170b and 170c, respectively, from the thumbwheel 172 to determine a degree of variation from the balanced load condition for arm 10. Thus, for actuation of switch 153, PLC 140 increases the lifting force applied to load point 98 by the corresponding percentage value indicated in the input 170b. For actuation of switch 155, PLC 140 decreases the lifting force applied to load point 98 relative to the load condition by the corresponding percentage value as indicated in the input 170c. The biased lifting mode continues for so long as the detected one of the switches 153 and 155 is actuated. PLC 140 may also reference the inputs 149 and 150 to terminate bias lifting mode in the event of operator actuation of button 126 to disengage load 122 while in biased lifting mode, or may reference the input 150 to terminate biased lifting mode in the event of a lost load condition.

Figure 6:
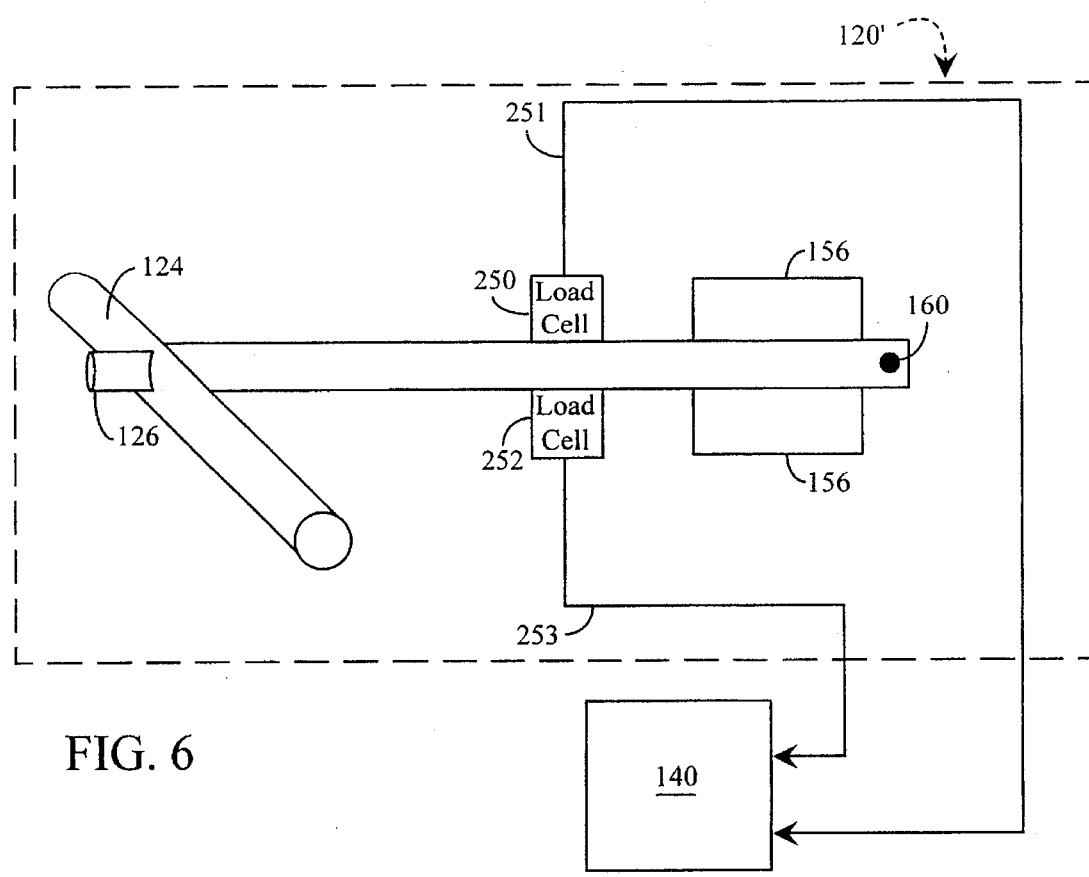
FIG. 6 shows a modification to the control scheme for the load balancing arm of FIG. 1.

FIG. 6 illustrates a modification to the above-described load balancing arm 10 relative to the indicated direction of vertical movement provided by the slight operator applied force to arm 124. In FIG. 6, the limit switches 153 and 155 are replaced by load cells 250 and 252, respectively. The load cells 250 and 252 produce outputs 251 and 253 corresponding to a magnitude of operator applied force on handle 124. In this configuration, the resilient structures 156 can be less resilient than that in the embodiment of FIG. 1 whereby the outputs 251 and 253 are more representative of the actual operator applied force to handle 124.

The control scheme for the embodiment of FIG. 6 as is generally identical to that discussed above, except that PLC 140 utilizes the magnitude of outputs 251 and 253 of load cells 250 and 252 in place of the selected percentage value previously provided by thumbwheel 172.

Thus, in biasing the lifting force applied to the load point 98, the change in lifting force to cause a movement of the load 122 may be proportional to the operator applied force on handle 124 as represented by the outputs 251 and 253 of load cells 250 and 252. More particularly, in response to a non-zero output 251 from load cell 250, PLC 140 calculates a deviation in lifting force as a function of the magnitude of output 251 to increase the lifting force applied at load point 98 and move the load 122 upward for so long as a non-zero output 251 is presented to PLC 140. Similarly, in response to a non-zero output 253 from load cells 252, PLC 140 modifies the lifting force applied at load 98 by reducing such lifting force as a function of the magnitude of output 253 and for so long as the output 253 is a non-zero output.

Figure 7:
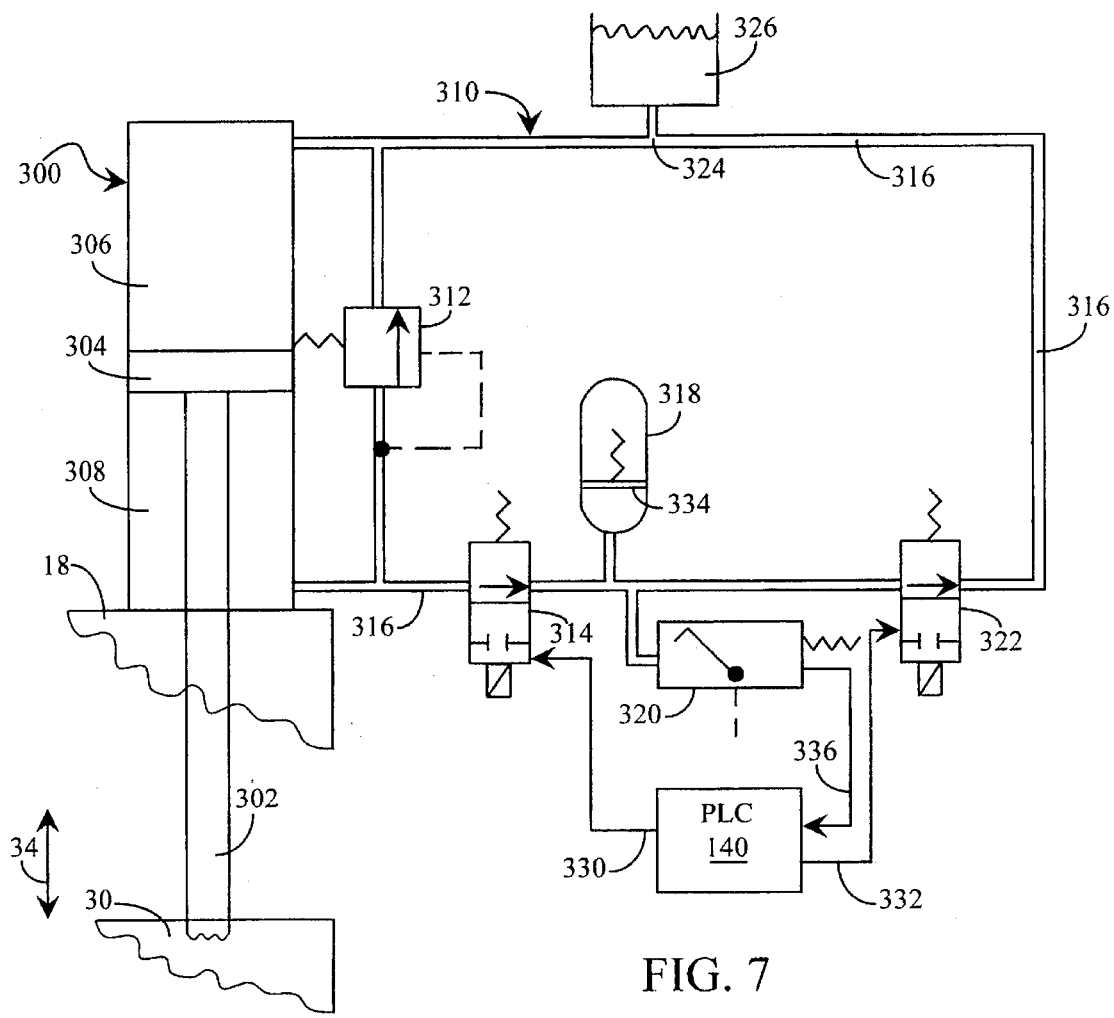
FIG. 7 illustrates a hydraulic brake and automatic load weight sensing modification to the load balancing arm of FIG. 1.

FIG. 7 illustrates another modification to the above-described load balancing arm 10 for providing automatic load 122 weight sensing and to the provision of an emergency brake for stopping movement of the arm 10 in the event of lost load or other such emergency conditions. In FIG. 7, a hydraulic cylinder 300 is fixedly mounted to the outer plates 18 of pivot housing 16. The downward extending piston rod 302 of cylinder 300 couples to the inner frame 30 of pivot housing 16 whereby movement of inner frame 30, as indicated by reference numeral 34, causes movement of the piston 304 within the cylinder 300. Cylinder 300 includes an upper chamber 306 and a lower chamber 308 separated by the piston 304. Chambers 306 and 308 are coupled by way of a hydraulic circuit 310. Hydraulic circuit 310 includes a pressure relief valve 312 immediately coupling the chambers 306 and 308 for pressure relief in the event of potentially damaging excess pressure within the system. Beginning at the lower chamber 308 and following a conduit 316 back to the upper chamber 306, the circuit 310 includes a brake valve 314, an accumulator piston 318, a hydraulic pressure sensor 320, and a load sense valve 322. The accumulator cylinder 318 and pressure sensor 320 couple to conduit 316 at T intersections. The valves 314 and 322 lie in series with the conduit 316. The conduit 316 continues from the valve 322 to a T intersection 324 coupling conduit 316 to a reservoir 326. Conduit 316 then continues from T intersection 324 to the upper chamber 306 of cylinder 300. In use, the chambers 306 and 308, the conduit 316, accumulator cylinder 318 and the reservoir 326 are filled with hydraulic fluid.

PLC 140 provides an output 330 for controllably actuating the brake valve 314 and provides an output 332 for controllably actuating the load sense valve 322. The valves 314 and 322 are normally maintained in an open condition.

Thus, under normal operation, the inner frame 30 moves vertically as indicated by the reference number 34 in response to movement of the load 122 throughout the work space 100. In response to such vertical movement of the inner frame 30, cylinder 300 pushes hydraulic fluid back and forth between its upper chamber 306 and lower chamber 308 by way of conduit 316. The reservoir tank 326 allows for cylinder rod 302 displacement and temperature expansion. By actuation of output 330 to close the brake valve 314, such exchange of fluid between chambers 306 and 308 is prevented and, therefore, further downward movement of inner frame 30 is locked. By so locking inner frame 30 against downward movement, the arm 10 is held against upward movement. Thus, the brake arrangement shown in FIG. 7 is a brake against upward movement of the arm 10. As may be appreciated, a second brake arrangement similar to that of FIG. 7 but attached at the lower side of inner frame 30 may be provided to secure arm 10 against downward movement if such braking action is desired. Alternatively, in providing a brake function against downward movement of arm 10, a check valve may be employed in the pneumatic circuit of cylinder 50 to trap the pressurized air in chamber 50 and bleed that air at a controlled rate from chamber 50a in order to accomplish slow controlled downward movement of arm 10.

The arrangement in FIG. 7 further provides a mechanism for detecting the weight of a load 122 attached to the load engaging mechanism 122. In response to operator actuation of button 126 to engage a load 122, PLC 140 first actuates the output 332 to close the valve 322. This performs a similar braking function as that provided by the brake valve 314, but allows several inches of movement at the load point 98 by virtue of the accumulator cylinder 318. More particularly, the accumulator cylinder 318 includes a spring biased piston 334 normally maintained in a fully extended position toward the conduit 316. By closing the load sense valve 322 and applying a lifting force by way of pneumatic cylinder 50, the accumulator cylinder 318 allows some of the fluid in the hydraulic circuit 310 to enter the cylinder 318 and allow slight movement, e.g., on the order of several inches at the load point 98. This small movement at the load point 98 allows the arm 10 to actually lift the load 122, but only a small distance. PLC 140 continues to increase the command 146 to provide an increasing magnitude lifting force on the load point 98 until a maximum load force for the arm 10 is quickly achieved. This maximum load force is a known, predetermined value. The hydraulic pressure sensor 320 provides a pressure value 336 to PLC 140 as representative of the pressure against sensor 320 within the conduit 316. Once the maximum lifting force is achieved by pneumatic cylinder 50, the weight of load 122 may be calculated as the known maximum lifting force value minus the detected pressure value 336, as suitably converted into a weight value corresponding to the load point 98.

In calculating a weight for the load 122 as described above, PLC 140 should take into account the condition of limit switches 153 and 155, in the embodiment of FIGS. 1 and 4, and load sensors 250 and 252, in the embodiment of FIG. 6. More particularly, because the operator applied forces to handle 124 will affect the calculation of load 122 weight, PLC 140 must account for such operator applied forces in calculating a weight for load 122. In the embodiment of FIG. 4 using limit switches 153 and 155, PLC 140 will not calculate a weight value for load 122 until neither of switches 153 and 155 are actuated, i.e., will not calculate a weight value until the operator has released handle 124. PLC 140 can provide to an operator an error message as an audio or visual indication of the error condition to inform the operator of the need to release handle 124 in order to establish a weight value for the load 122. In the embodiment of FIG. 6, PLC 140 may take into account the magnitude of outputs 251 and 253 from the load cells 250 and 252 in order to calculate a direction and magnitude of operator applied force to handle 124, and thereby account for such forces in calculating a weight for load 122. As may be appreciated, the calculated weight for load 122 may be employed in the control scheme illustrated in FIG. 5 where the calculated weight for load 122 would replace the selected weight value represented by input 170a provided by the thumbwheel 172a.

Figure 8:
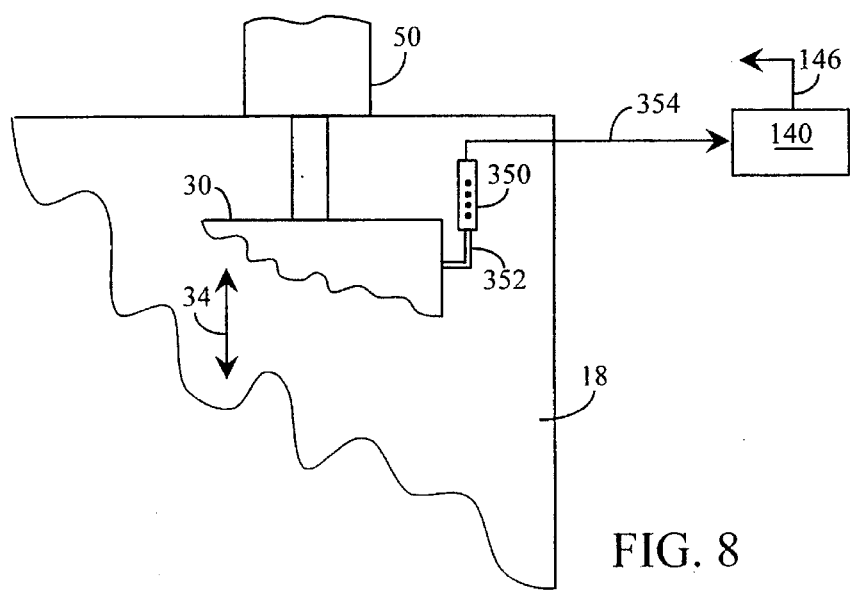
FIG. 8 illustrates a second method of automatic load weight sensing for the load balancing arm of FIG. 1.

FIG. 8 illustrates another method of load sensing for the load balancing arm 10. In FIG. 8, a lineal encoder 350 mounts to the inner surface of one of side plates 18 and includes a plunger arm 352 affixed to the inner frame 30 of pivot housing 16. Thus, as inner frame 30 moves vertically, as indicated at reference numeral 34, lineal encoder 350 detects the position of inner frame 30. To accomplish automatic load weight sensing in this embodiment of the present invention, PLC 140 responds to operator actuation of button 126, actuates the load engaging mechanism 120, and verifies that a load has been successfully attached to the load engaging mechanism 120. At this point, PLC 140 samples the output 354 from lineal encoding device 350 as a reference position for inner frame 30. PLC 140 then begins to ramp the lifting force upward by controlled variation in the command 146 to regulator 144 while monitoring the output 354 from encoder 350. When the output 354 changes relative to the reference value sampled prior to lifting of load 122, PLC 140 infers that the current lifting force applied at load point 98 corresponds to the weight of load 122 and thereby establishes the weight of load 122. As may be appreciated, this detected weight for load 122 is then used in the various modes of operation for load balancing arm 10 such as in maintaining a constant lifting force to balance the load 122, and in providing suitable biasing of the lifting force relative to load 122 to accomplish vertical movement of load 122 as discussed above in response to the actuation of limit switches 153 and 155 (FIGS. 1 and 4) or the actuation of load cells 250 and 252 (FIG. 6).

Thus, a load balancing arm in accordance with the present invention has been shown and described. The load balancing arm includes a programmable control element and electronic air regulation for providing a consistent and precise lifting force within a given range of lifting forces for the balancing arm. The programmable control element manages the lifting force as necessary to switch between lifting forces applied in a loaded and unloaded condition of the arm. Furthermore, the load balancing arm can provide automatic sensing of variation in weight of loads handled. Such variation may be by selection among a set of preset load values, or may be accomplished by way of automatic load weight sensing. The lifting arm of the present invention is responsive to slight operator applied forces to accomplish a biasing of the lifting force applied to the load in order to move the load in a desired direction as indicated by the slight operator applied forces. The operator need not overcome counteracting forces within the system which would otherwise oppose operator applied forces directed toward movement of the load within the work space. Accordingly, because the operator exerts less effort in managing a load by use of the load balancing arm of the present invention, the worker's task is made less strenuous and more productive.

It will be appreciated that the present invention is not restricted to the particular embodiment that has been described and illustrated, and that variations may be made therein without departing from the scope of the invention as found in the appended claims and equivalence thereof. For example, the present invention has been illustrated with reference to a pantographic load balancing arm, however, it should be understood that many other forms of load balancing systems as implemented with the control scheme of the present invention would fall within the scope of the present invention. For example, such load balancing systems may include suspended air cylinders, air actuated hoists, and cable cylinders. Also, while the present invention has been shown and illustrated in the context of a particular load engaging mechanism, i.e., in engaging clamping jaws, it will be appreciated that a great variety of such load engaging mechanism may be applied to load balancing arms and remain within the scope of the present invention.

What is claimed is:

1. In a load balancing system including a load engaging mechanism for selectively coupling a load to an arm and including a lifting mechanism for selectively providing a load counterbalancing lifting force adaptable to loaded and unloaded conditions of the arm, a control arrangement comprising:

a pneumatic cylinder as said lifting mechanism and coupled to said load engaging mechanism and providing said load counterbalancing lifting force as a function of the pressure of air maintained in a chamber thereof;

a programmable control element responsive to operator input and conditions of said system while in use, said control element including an electric output signal representing a selected counterbalancing lifting force;

an electronic air pressure regulation arrangement responsive to said control element electric output signal and providing a selected air pressure condition within said chamber corresponding to said electric output signal, said air pressure regulation arrangement including a pilot air pressure regulator receiving said electric output signal and producing a corresponding pressure in an output conduit thereof as a pressure set point, and further including a high relief air pressure regulator receiving said conduit and applying a corresponding higher volume air pressure within said chamber of said pneumatic cylinder, said high relief air pressure regulator being responsible for introducing air into and bleeding air from said chamber in response to change deviation from said pressure set point relative to air pressure within said chamber; and a second conduit coupling said chamber and said pilot air pressure regulator whereby said pilot air pressure regulator compares the air pressure present in said chamber to said air pressure set point and deviates said pressure set point as provided to said high relief air pressure regulator in order to compensate for changes in air pressure within said chamber by maintaining a constant air pressure therein.

2. In a load balancing system including a load engaging mechanism for selectively coupling a load to an arm and including a lifting mechanism for selectively providing a load counterbalancing lifting force adaptable to loaded and unloaded conditions of the arm, a control arrangement comprising:

a pneumatic cylinder as said lifting mechanism and coupled to said load engaging mechanism and providing said load counterbalancing lifting force as a function of the pressure of air maintained in a chamber thereof;

a programmable control element responsive to operator input and conditions of said system while in use, said control element including an electric output signal representing a selected counterbalancing lifting force;

an electronic air pressure regulation arrangement responsive to said control element electric output signal and providing a selected air pressure condition within said chamber corresponding to said electric output signal; and a load weight sensing arrangement operatively coupled to said control arrangement and comprising a brake for holding said arm against movement but allowing slight movement of a distal portion of said arm in a lifting direction, said brake including a sensor providing an output representative of a magnitude of braking force applied thereby, said control arrangement selectively actuating said load engaging mechanism and selectively applying lifting force through a range of lifting force to a known lifting force such that load weight is calculated by first coupling the load engaging mechanism to the load, actuating said brake, applying said known lifting force and calculating said load weight as the known lifting force minus a force applied by the brake as represented by said sensor output.

3. The control arrangement according to claim 2 wherein said brake is a hydraulic brake comprising:

a hydraulic cylinder coupled to a moving component of said arm and responsive to movement of said component by causing corresponding movement of fluid within a hydraulic circuit attached to said cylinder;

a brake valve within said hydraulic circuit and coupled for selected actuation by said control arrangement for arresting movement of hydraulic fluid within said circuit and thereby braking movement of said arm; and an accumulator cylinder coupled to said hydraulic circuit and allowing accumulation of a given volume of hydraulic fluid therein corresponding to said movement of said distal portion of said arm whereby following actuation of said brake valve said arm is held against said slight movement at the distal end of said arm.

4. In a load balancing system including a load engaging mechanism for selectively coupling a load to an arm and including a lifting mechanism for selectively providing a load counterbalancing lifting force adaptable to loaded and unloaded conditions of the arm, a control arrangement comprising:

a pneumatic cylinder as said lifting mechanism and coupled to said load engaging mechanism and providing said load counterbalancing lifting force as a function of the pressure of air maintained in a chamber thereof;

a programmable control element responsive to operator input and conditions of said system while in use, said control including an electric output signal representing a selected counterbalancing lifting force;

an electronic air pressure regulation arrangement responsive to said control element electric output signal and providing a selected air pressure condition within said chamber corresponding to said output signal; and a lifting force biasing arrangement operatively coupled to said control arrangement and modifying operation of the lifting mechanism in response to operator applied forces, the biasing arrangement including an input mechanism responsive to slight operator applied force in a desired direction of movement for the load and producing a biasing signal representing a direction of said slight operator applied force, said control arrangement being responsive to said biasing signal to deviate said counterbalancing lifting force to aid in movement of the arm in the indicated direction, said control arrangement deviating from said counterbalancing lifting force in response to said biasing signal by a predetermined percentage of said counterbalancing lifting force.

* * * * *